US005741024A

United States Patent [19]

Enders

[11] Patent Number: 5,741,024
[45] Date of Patent: Apr. 21, 1998

[54] AIRBAG MODULE COVER ATTACHMENT AND METHOD OF ATTACHING A MODULE COVER TO AN AIRBAG MODULE

[75] Inventor: Mark L. Enders, North Ogden, Utah

[73] Assignee: Morton International, Inc., Chicago, Ill.

[21] Appl. No.: 656,404

[22] Filed: May 31, 1996

[51] Int. Cl.$^6$ ................................................ B60R 21/20
[52] U.S. Cl. ........................ 280/728.3; 280/731; 280/732
[58] Field of Search ......................... 280/728.3, 728.2, 280/721, 732, 730.1, 728.1

[56] References Cited

U.S. PATENT DOCUMENTS

| 4,895,389 | 1/1990 | Pack, Jr. ................ | 280/728.3 |
|---|---|---|---|
| 4,941,678 | 7/1990 | Lauritzen et al. ........ | 280/732 |
| 5,280,946 | 1/1994 | Adams et al. ............ | 280/728.2 |
| 5,354,093 | 10/1994 | Schenck et al. .......... | 280/728.3 |
| 5,409,256 | 4/1995 | Gordon et al. ........... | 280/728.2 |
| 5,435,596 | 7/1995 | Rose et al. .............. | 280/728.2 |
| 5,460,400 | 10/1995 | Davidson ................ | 280/728.2 |
| 5,490,689 | 2/1996 | Garner et al. ............ | 280/728.2 |
| 5,523,532 | 6/1996 | Leonelli et al. .......... | 280/731 |
| 5,658,008 | 8/1997 | Herrmann et al. ......... | 280/728.2 |

FOREIGN PATENT DOCUMENTS 5-262198  10/1993  Japan ................................. 280/728.3

*Primary Examiner*—Peter C. English
*Attorney, Agent, or Firm*—George W. Rauchfuss, Jr.

[57] ABSTRACT

An airbag module incorporating a staked module cover attachment. The airbag module has a module housing defining four sets of openings, the four sets generally forming a rectangle, and a folded, inflatable airbag cushion and an airbag inflator secured to the module housing between the four sets of openings. A thermoplastic module cover defining at least one tear seam includes a lid positioned over the airbag cushion. Four attachment legs extend unitary from the lid and terminate at bottom edges butting against the module housing corresponding with the four sets of openings defined by the module housing. A plurality of spaced-apart stakes are unitary with and extend from the bottom edges of the attachment legs, and each of the stakes extends through one of the openings of the sets of openings to distal ends secured such that the stakes cannot be withdrawn from the openings, securing the module cover to the module housing. The distal ends are secured by being formed into heads by ultrasonic or induction welding. Alternatively, the distal ends can be secured by being joined to form bridges between pairs of stakes, or fused to channel sections.

20 Claims, 6 Drawing Sheets

5,741,024

AIRBAG MODULE COVER ATTACHMENT AND METHOD OF ATTACHING A MODULE COVER TO AN AIRBAG MODULE

FIELD OF THE INVENTION

The present invention relates to a vehicle airbag module with a new and useful module cover attachment and a method of attaching a module cover to the airbag module.

BACKGROUND OF THE INVENTION

An airbag module is employed in an automobile for protecting an occupant against injury by deploying an inflated airbag cushion to physically restrain the occupant's body when the automobile encounters a collision. A driver side airbag module normally includes a module cover attached to a module baseplate, and an inflator and an airbag cushion secured to the module baseplate and covered by the module cover. A passenger side airbag module normally includes a module cover attached to and covering the mouth of a trough-shaped reaction canister containing an inflator and an airbag cushion. In both types of airbag modules, the module cover includes at least one tear seam or weakened portion for allowing the airbag cushion to break through the cover during inflation of the airbag cushion resulting from a collision of the vehicle. For aesthetical purposes, the tear seam is ideally positioned on a side of the module cover as opposed to a front face of the cover presented to a driver or passenger.

In some existing airbag modules, rivets or bolts are used to secure the module cover to the module baseplate. Such an attachment method can allow the tear seam to be positioned on the side of the module cover, and can allow for a relatively simple design of the module cover. Using rivets or bolts, however, adds to the number of parts comprising the airbag module and complicates the assembly of the airbag module.

In other existing driver side airbag modules, the module beseplate includes a sidewall extending upwardly from the baseplate and terminating at a rim forming an open top. Locking arms having grooves for engaging the rim extend from the cover. The airbag module also includes clamping means for clamping the locking arms to the rim to secure the cover to the baseplate. Such an airbag module is disclosed in U.S. Pat. No. 5,280,946 which is assigned to the assignee of the present invention. While such a rim and groove attachment method reduces parts, a large amount of force is required to press fit the locking arms of the cover over the rim.

In some existing passenger side airbag modules, attachment legs extend from the module cover for interlocking engagement with mating portions of walls of the reaction canister. At least one band encircles the attachment legs for holding them in their interlocking engagement with the reaction canister. Such an airbag module is disclosed in U.S. Pat. No. 5,435,596 which is assigned to the assignee of the present invention. While such an attachment method does allow the tear seam to be positioned on the side of the module cover, the mating portions of the attachment legs require a complicated injection molding process.

An object, therefore, of the present invention is to provide an airbag module cover attachment system that will secure a module cover to an airbag module strongly enough to ensure that the cover will remain attached during deployment of an airbag cushion through a tear seam of the cover.

Another object of the present invention is to provide an airbag module cover attachment system that is relatively simple and does not require additional parts such as rivets, bolts, clamping means or a band, for example.

An additional object of the present invention is to provide an airbag module cover attachment system that is relatively easy to assemble.

SUMMARY OF THE INVENTION

In carrying out this invention, there is provided an airbag module including a module housing, defining a first set of openings and a second set of openings. The first set of openings is in spaced, opposing relation to the second set of openings. A folded, inflatable airbag cushion is secured to the module housing between the first and the second sets of openings, and an airbag inflator is secured to the module housing for providing inflation gas for inflating the airbag cushion.

The airbag module also includes a module cover defining at least one tear seam. The module cover includes a lid positioned over the airbag cushion. A first attachment leg and a second attachment leg extend from the lid and terminate at bottom edges butting against the module housing. The first attachment leg and the second attachment legs are in spaced, opposing relationship in alignment with the first and the second sets of openings defined by the module housing, with the airbag cushion located between the at least two attachment legs.

A plurality of spaced-apart stakes extend from the bottom edges of the first and the second attachment legs, and each of the stakes extends through one of the openings of the first and second sets of openings and terminates in a distal end. The airbag module further includes means for securing the distal ends of each plurality of stakes against a second surface of the module housing opposite the first surface so that the stakes cannot be withdrawn from the openings, thereby securing the module cover to the module housing.

According to one aspect of the present invention, the means for securing the distal ends of each plurality of stakes comprises the distal ends of the stakes forming heads larger than the openings. According to another aspect of the present invention, the plurality of stakes are provided in pairs of adjacent stakes, and the means for securing the distal ends of each plurality of stakes comprises the distal ends of each pair of adjacent stakes being joined and forming a bridge between the pair of adjacent stakes. According to an additional aspect of the present invention, the means for securing the distal ends of each plurality of stakes comprises a first channel section and a second channel section. The first channel section has a groove positioned over the distal ends of the plurality of stakes extending from the first attachment leg, with the distal ends of the plurality of stakes attached to the first channel section. The second channel section has a groove positioned over the distal ends of the plurality of stakes extending from the second attachment leg, with the distal ends of the plurality of stakes attached to the second channel section. According to an additional aspect of the present invention, the distal ends of each plurality of stakes are fused to the channel sections.

According to a-further aspect of the present invention, the module housing comprises a module baseplate. According to yet another aspect of the present invention, the airbag module further includes a third set of openings and a fourth set of openings defined by the module baseplate. The third set of openings are in spaced, opposing relation to the fourth set of openings with the airbag cushion located therebetween so that the four sets of openings generally form a rectangle. A third attachment leg and a fourth attachment leg extend from the lid and terminate at bottom edges butting against the module baseplate. The third attachment leg and the fourth attachment legs are in spaced, opposing relationship, in alignment with the third and the fourth sets of openings defined by the module housing and with the airbag cushion located therebetween. A plurality of spaced-apart stakes extend from the bottom edges of the third and the fourth attachment legs. Each of the stakes extends through one of the openings of the third and the fourth sets of openings and terminates in a distal end. The airbag module also includes means for securing the distal ends of the third and the fourth plurality of stakes against a second surface of the module housing opposite the first surface so that those stakes cannot be withdrawn from the openings.

According to a still further aspect of the present invention, the module housing comprises a trough-shaped reaction canister having a first and a second sidewall defining opposing ends closed by a first and a second endplate. The reaction canister and endplates define a mouth of the module housing. The airbag module further includes a first flange extending outwardly from the first sidewall of the reaction canister, and defining the first set of openings. A second flange extends outwardly from the second sidewall of the reaction canister, and defines the second set of openings. A third flange extends outwardly from the first endplate of the reaction canister, and defines a third set of openings. A fourth flange extends outwardly from the second endplate of the reaction canister, and defines a fourth set of openings.

A third attachment leg and a fourth attachment leg extend from the lid and terminate at bottom edges butting against first surfaces of the third flange and the fourth flange, in alignment with the third and the fourth sets of openings. A plurality of spaced-apart stakes extend from the bottom edges of the third and the fourth attachment legs, and each of the stakes extends through one of the openings of the third and the fourth sets of openings, and terminates in a distal end. The airbag module also includes means for securing the distal ends of each plurality of stakes extending from the third and the fourth attachment legs against second surfaces of the third and the fourth flanges opposite the first surfaces so that the stakes cannot be withdrawn from the openings of the third and the fourth sets of openings.

According to a still further aspect of the present invention, the at least one tear seam of the module cover comprises three tear seams defined by three of the four attachment legs.

A method of attaching a module cover to an airbag module is also provided. The method comprises providing an airbag module and a module cover as described above. The stakes of the first attachment leg are inserted through the openings of the first set of openings, and the stakes of the second attachment leg are inserted through the openings of the second set of openings until the bottom edges of the first and the second attachment legs butt against a first surface of the module housing. The distal ends of the stakes are then secured against a second surface of the module housing opposite the first surface such that the stakes cannot be withdrawn from the openings, to secure the module cover to the module housing. If the module cover includes third and fourth attachment legs, the stakes of the third attachment leg are inserted through the openings of the third set of openings, and the stakes of the fourth attachment leg are inserted through the openings of the fourth set of openings until the bottom edges of the third and the fourth attachment legs butt against the first surface of the module housing. The distal ends of the stakes of the third and the fourth attachment legs are then secured against the second surface of the module housing.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
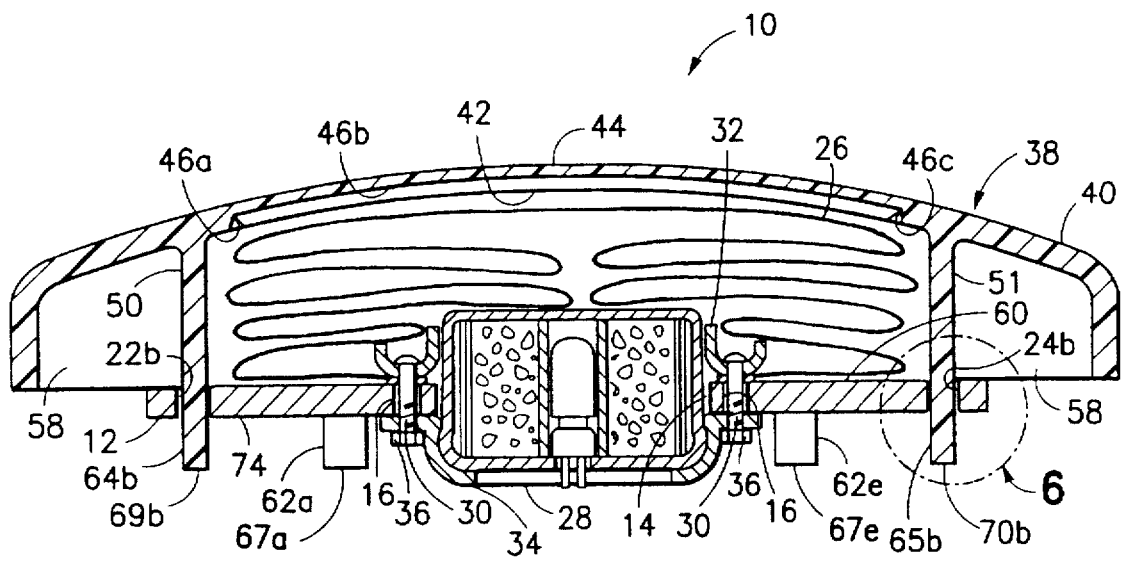
FIG. 1 is a sectional view of an airbag module according to the present invention taken along the line 1—1 of FIG. 5.
Figure 4:
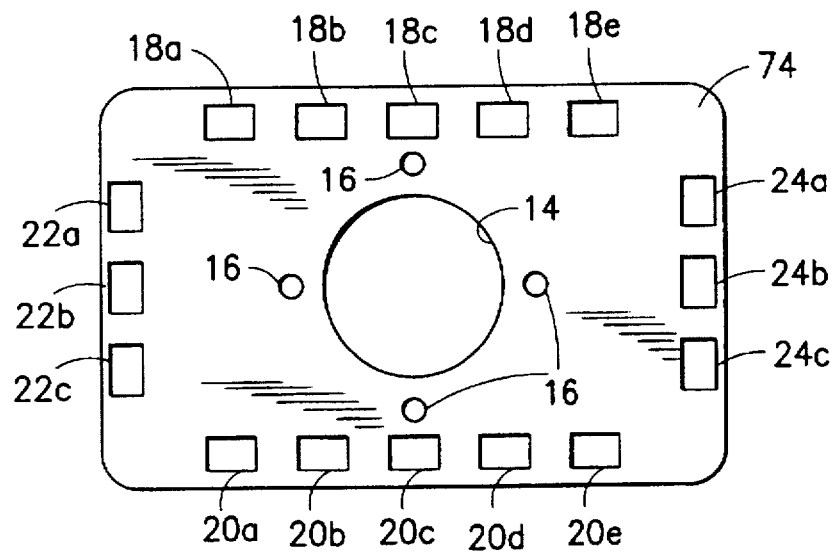
FIG. 4 is a reduced bottom plan view of a module baseplate of the airbag module of FIG. 1 defining a plurality of spaced-apart openings for receiving the stakes of the module cover of FIGS. 2 and 3.
Figure 5:
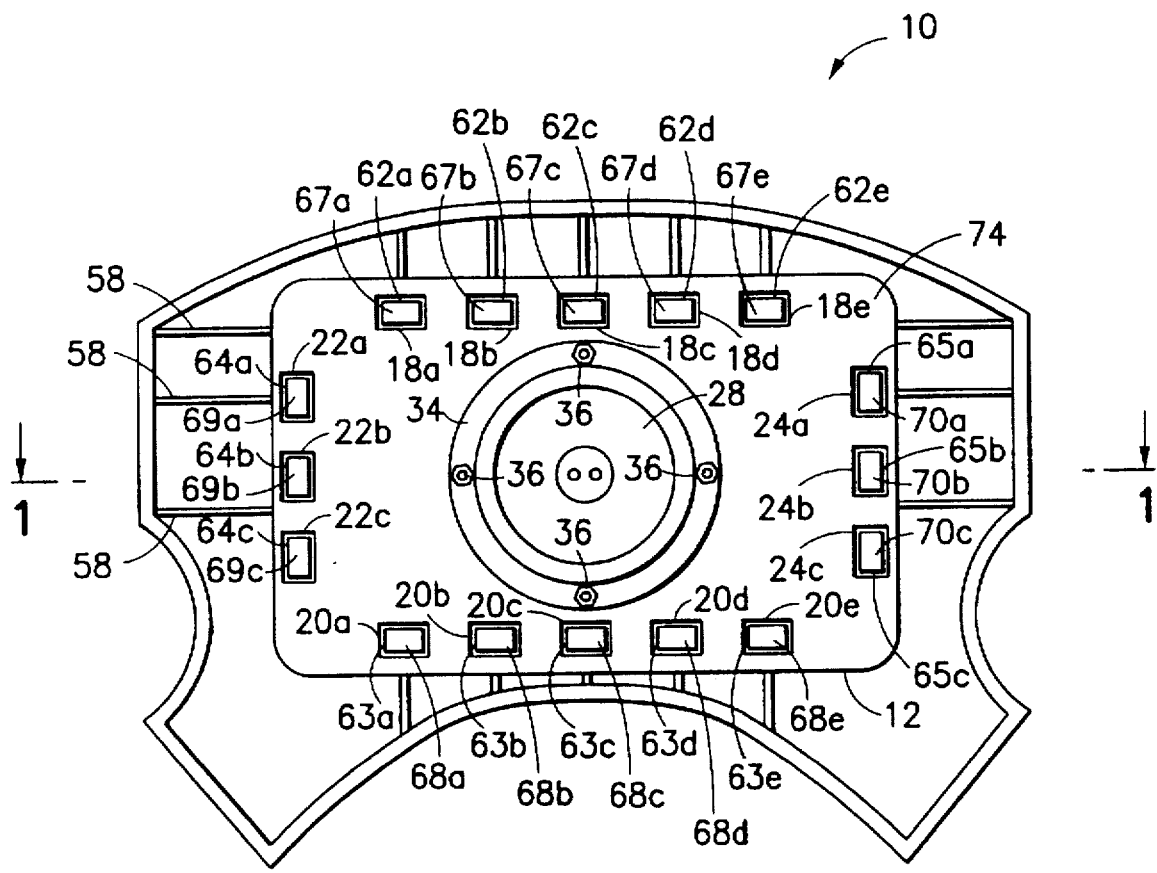
FIG. 5 is a reduced bottom plan view of the airbag module of FIG. 1 showing the stakes of the module cover extending through the openings of the module baseplate.

Referring first to FIGS. 1 and 5, the present invention is directed to a driver side airbag module 10 for use in a motor vehicle and including a module housing 12. As best shown in FIG. 4, the module housing is in the form of a generally rectangular and flat baseplate 12 which is made from a suitably rigid and strong material such as aluminum or steel or an engineering plastic, for example. A generally circular inflator aperture 14 and four surrounding fastener holes 16 are defined by the baseplate 12.

A first set of five openings 18a–18e and a second set of five openings 20a–20e, in spaced, opposed, parallel relation, are defined by the baseplate 12 adjacent opposite sides of the baseplate. A third set of three openings 22a–22c and a fourth set of three openings 24a–24c, in spaced, opposed, parallel relation, are also defined by the baseplate 12 adjacent opposite ends of the baseplate, so that the four sets of openings generally form a rectangle.

As best shown in FIG. 1, a folded, inflatable airbag cushion 26 is positioned on the baseplate 12 over the inflator aperture 14 and between the four sets of openings, and an airbag inflator 28 extends through the inflator aperture and into the airbag cushion. Bolts 30 pass through a retainer ring 32, the airbag cushion 26, the baseplate 12 and a flange 34 of the inflator 28 and are fastened with nuts 36 or the like to secure the airbag cushion and inflator to the baseplate. The inflator 28, which provides inflation gas for inflating the airbag cushion 26, and the airbag cushion are known in the art and, therefore, not described here in detail.

Figure 2:
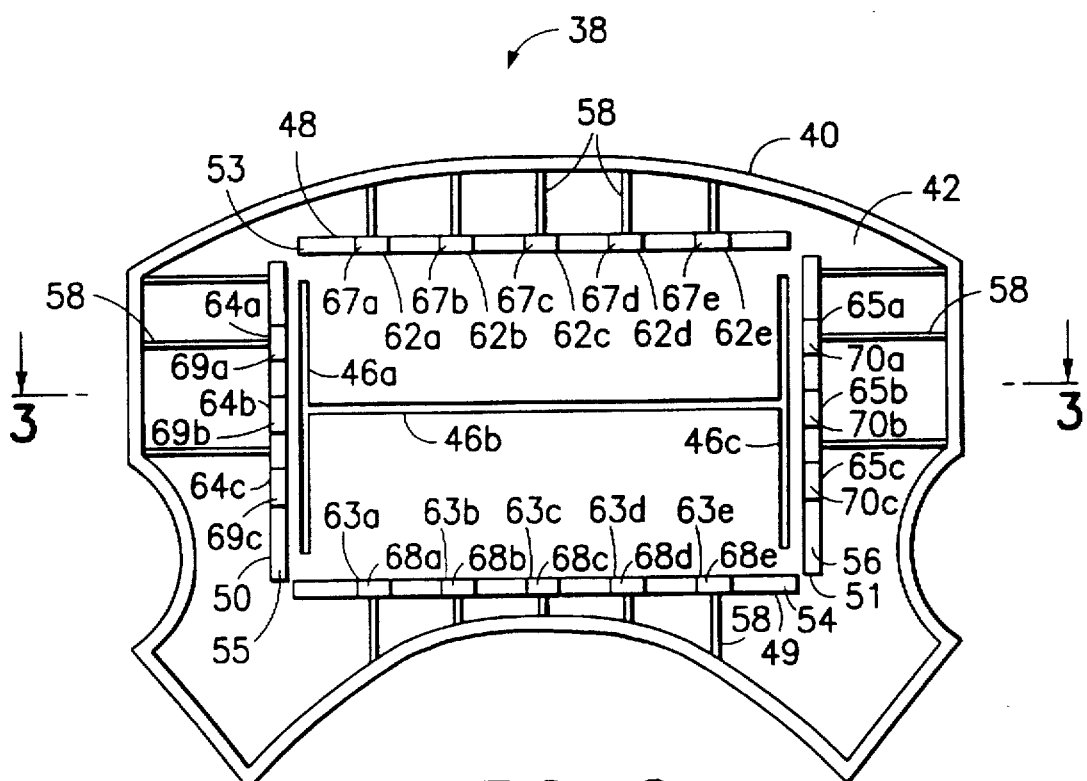
FIG. 2 is a reduced bottom plan view of a module cover of the airbag module of FIG. 1 having a plurality of spaced-apart stakes extending therefrom.
Figure 3:
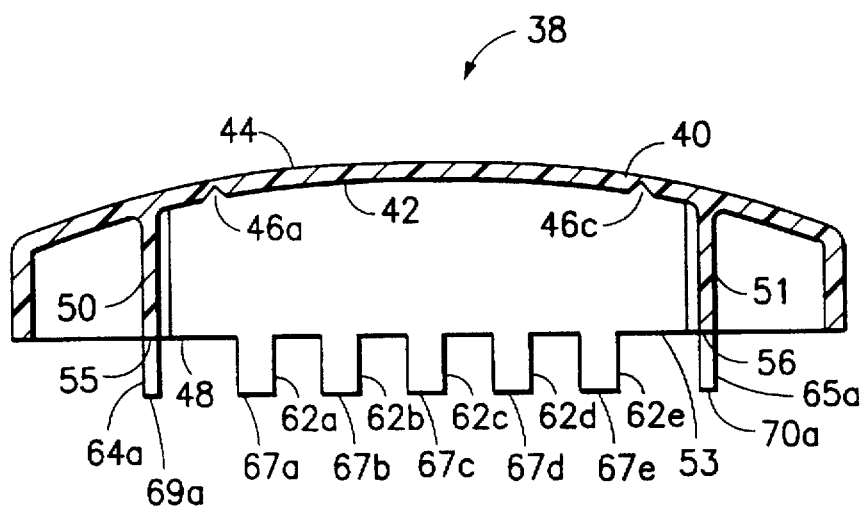
FIG. 3 is a sectional view of the module cover taken along the line 3—3 of FIG. 2.

The airbag module 10 also includes a module cover 38 made from a suitable resilient and sturdy thermoplastic, and the module cover includes a lid 40. As best shown in FIGS. 2 and 3, the lid 40 has an inner surface 42 and a decorative outer surface 44, and the lid defines three tear seams 46a,46b,46c generally forming an "H". The lid 40 is positioned over the folded airbag cushion and the tear seams 46a,46b,46c allow the airbag cushion to break through the lid upon being inflated by the inflator A first attachment leg 48 and a second attachment leg 49 are unitary with and extend from the inner surface 42 of the lid 40 and terminate at bottom edges 53,54. The first attachment leg 48 and the second attachment leg 49 are in spaced, opposing, parallel relationship in alignment with the first and the second sets of openings 18a–18e,20a–20e defined by the baseplate 12. A third attachment leg 50 and a fourth attachment leg 51 are also unitary with and extend from the inner surface 42 of the lid 40 and terminate at bottom edges 55,56. The third attachment leg 50 and the fourth attachment leg 51 are in spaced, opposing, parallel relationship in alignment with the third and the fourth sets of openings 22a–22c,24a–24c defined by the baseplate 12. The lid 40 also includes a plurality of strengthening ribs 58 extending between the lid and the attachment legs 48–51.

The bottom edges 53–56 of the four attachment legs 48–51 butt against a first surface 60 of the baseplate 12, in alignment with the four sets of openings 18a–18e,20a–20e, 22a–22c,24a–24c defined by the baseplate. Together, the four attachment legs 48–51 space the lid 40 away from the baseplate 12 and generally form a rectangle surrounding the folded airbag cushion 26 and the portion of the inflator 28 positioned above the baseplate. The four attachment legs 48–51, the lid 40 and the baseplate 12 substantially contain and protect the folded airbag cushion 26. It should be noted that the four, separate attachment legs 48–51 could be unitary in the form of a single, continuous attachment wall defining a rectangle or another suitable shape such as a circle, for example, encircling the airbag cushion 26. In addition, the module cover 38 could have more or less than four attachment legs with the baseplate 12 defining a similar number of sets of openings, as long as the module cover has at least two opposed attachment legs.

Five spaced-apart stakes 62a–62e are unitary with and extend from the bottom edge 53 of the first attachment leg 48 to distal ends 67a–67e, and five spaced-apart stakes 63a–63e are unitary with and extend from the bottom edge 54 of the second attachment leg 49 to distal ends 68a–68e.

Three spaced-apart stakes 64a–64c are unitary with and extend from the bottom edge 55 of the third attachment leg 50 to distal ends 69a–69c, and three spaced-apart stakes 65a–65c are unitary with and extend from the bottom edge 56 of the fourth attachment leg 51 to distal ends 70a–70c. It should be noted that the number of stakes extending from the attachment legs and the number of openings in the sets of openings can be suitably increased or decreased.

Figure 6:
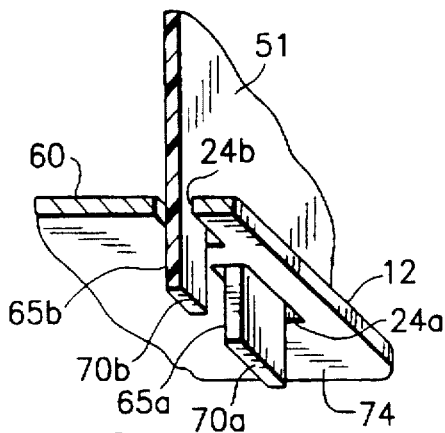
FIG. 6 is a perspective view, partially in section, of the circled portion 6 of the airbag module of FIG. 1.
Figure 7:
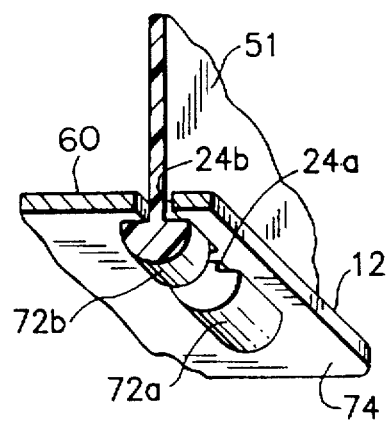
FIG. 7 is a perspective view, partially in section, showing the distal ends of the stakes of FIG. 6 formed into heads.

As shown in FIGS. 4–6, each of the stakes 62a–62e of the first attachment leg 48 extends through one of the openings of the first set of openings 18a–18e defined by the baseplate 12, and each of the stakes 63a–63e of the second attachment leg 49 extends through one of the openings of the second set of openings 20a–20e. Also, each of the stakes 64a–64c of the third attachment leg 50 extends through one of the openings of the third set of openings 22a–22c, and each of the stakes 65a–65c of the fourth attachment leg 51 extends through one of the openings of the fourth set of openings 24a–24c. As shown in FIG. 7, means for securing the distal ends 70a,70b of the stakes 65a,65b against a second surface 74 of the baseplate 12 so that the stakes cannot be withdrawn from the openings 24a,24b comprise the distal ends being deformed or, more specifically, forming heads 72a,72b (although not shown, all of the distal ends of all of the stakes form heads), securing the module cover 38 to the baseplate 12.

A method of attaching the module cover 38 to the baseplate 12 includes: inserting the stakes 62a–62e of the first attachment leg 48 through the first set of openings 18a–18e, inserting the stakes 63a–63e of the second attachment leg 49 through the second set of openings 20a–20e, inserting the stakes 64a–64c of the third attachment leg 50 through the third set of openings 22a–22c, and inserting the stakes 65a–65c of the fourth attachment leg 51 through the fourth set of openings 24a–24c until the bottom edges 53–56 of the four attachment legs butt against the first surface 60 of the baseplate 12. The distal ends 67a–67e,68a–68e, 69a–69c, 70a–70c of the stakes 62a–62e,63a–63e,64a–64c,65a–65c are then secured against the second surface 74 of the baseplate 12 such that the stakes cannot be withdrawn from the openings 18a–18e, 20a–20e,22a–22c,24a–24c, securing the module cover 38 to the baseplate 12. In particular, as shown in FIG. 7, the distal ends 70a,70b of the stakes 65a,65b are formed generally into heads 72a,72b (although not shown, all of the distal ends of all of the stakes are formed into heads) utilizing any suitable thermal forming process such as ultrasonic or induction welding or thermo pneumatic processes, for example. The heads 72a,72b preferably butt against the second surface 74 of the baseplate 12 to provide a tight, shake-and rattle-free attachment.

It should be appreciated that the heads 72a,72b shown in FIG. 7 are idealized and the heads actually formed may be somewhat different in shape, as long as the heads are wider and/or longer and generally larger than the openings 18a–18e,20a–20e,22a–22c,24a–24c so that the heads cannot fit through the openings. The attachment legs 48–51 and the stakes 62a–62e,63a–63e,64a–64c,65a–65c extending therefrom provide the benefit of being relatively simple to mold unitary with the lid 40 to form the module cover 38.

Figure 8:
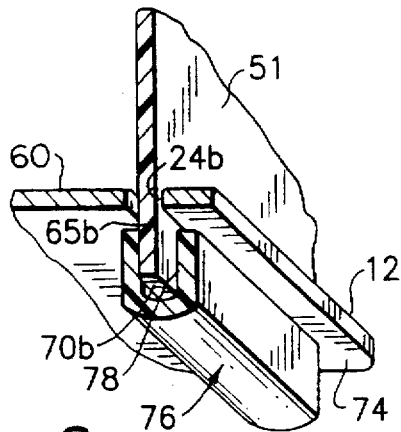
FIG. 8 is a perspective view, partially in section, showing the distal ends of the stakes of FIG. 6 fused to a channel section.

As shown in FIG. 8, the distal ends 70a,70b of the stakes 65a,65b can alternatively be secured by being fused to a channel section 76 having a slot 78 that fits over the distal ends. Although not shown, three other channel sections, similar to channel section 76, are provided for mating with the stakes 62a–62e, 63a–63e,64a–64c of the other three attachment legs 48,49,50, and, if desired, the four channel sections can be provided as a single unitary, channel generally forming a rectangle. The slot 78 of the channel section 76 is simply slipped over the distal ends 70a,70b of the stakes 65a,65b until the channel section preferably butts against the second surface 74 of the baseplate 12 and a suitable thermal forming process such as induction welding is used to fuse the distal ends to the channel to secure the module cover 38 to the baseplate 12. Alternatively, the distal ends 70a,70b can be attached to the channel section 76 in another suitable manner such as with an adhesive, for example. The channel sections provide the benefit of added strength to the attachment between the stakes and the baseplate 12 without changing the simple design of the module cover 38.

Figure 9:
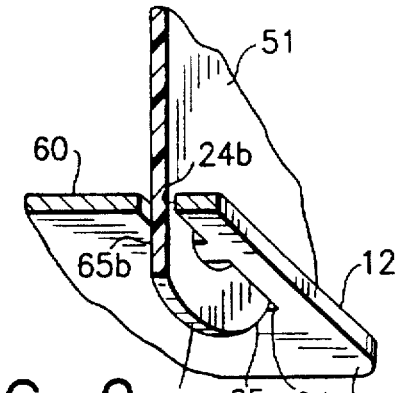
FIG. 9 is a perspective view, partially in section, showing the distal ends of the stakes of FIG. 6 joined to form a bridge.

The stakes of the four attachment legs, which are provided in an end-to-end or "in series" configuration, can alternatively be secured by joining the distal ends of adjacent pairs of the stakes 65a,65b to form a bridge 80 as shown in FIG. 9. (Although not shown, all of the stakes or only some of the stakes may be secured by bridging.) The distal ends of the stakes 65a,65b are joined by a suitable thermal forming process to form the bridge 80. Bridging between the stakes provides the benefit of added strength to the attachment between the module cover 38 and the baseplate 12 without changing the simple design of the module cover.

Figure 10:
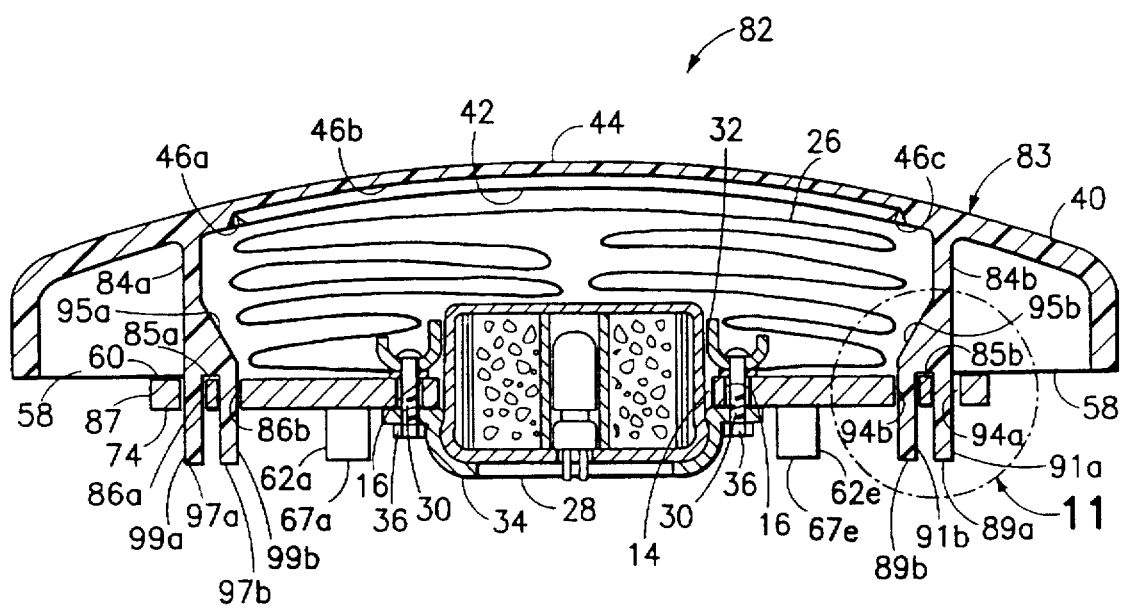
FIG. 10 is a sectional view of another airbag module according to the present invention, wherein stakes are provided in side-by-side pairs.
Figure 11:
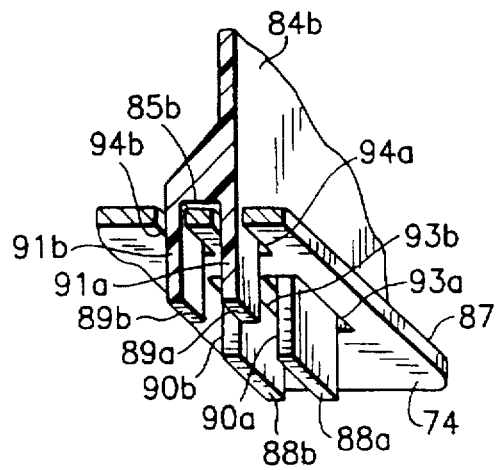
FIG. 11 is a perspective view, partially in section, of the circled portion 11 of the airbag module of FIG. 10.
Figure 12:
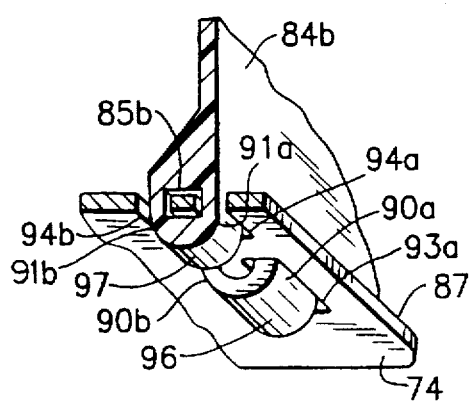
FIG. 12 is a perspective view, partially in section, showing the distal ends of the pairs of side-by-side stakes of FIG. 11 joined to form bridges.

Referring to FIG. 10, another airbag module 82 according to the present invention is provided. The airbag module 82 of FIGS. 10–12 is similar to the airbag module 10 of FIGS. 1–9 and elements of the airbag module 82 that are the same as elements of the airbag module 10 have the same reference numerals. As shown in FIG. 10, the airbag module 82 has a third attachment leg 84a and a fourth attachment leg 84b extending from the lid 40 of a module cover 83 and terminating at bottom edges 85a,85b butting against the first surface 60 of a baseplate 87. The third and fourth attachment legs 84a,84b each have a tapering outwardly portion 94a, 95b leading to the bottom edges 85a,85b so that the bottom edges are wider than the bottom edges 55,56 of the third and the fourth attachment legs 50,51 of the airbag module 10 of FIG. 1. A side-by-side or "parallel" pair of stakes 99a,99b extends from the bottom edge 85a of the third attachment leg 84a to distal ends 98a,98b. The baseplate 87 defines a third set of side-by-side openings 86a,86b for receiving the pair of stakes 99a,99b of the third attachment leg 84a. Although not shown, a total of three pairs of stakes extend from the third attachment leg 84a, and side-by-side pairs of stakes can extend from the each of the first and second attachment legs 48,49. Referring also to FIG. 11, four distal ends 88a,88b and 89a,89b of two pairs of side-by-side stakes 90a,90b and 91a,91b of the fourth attachment leg 84b extend through two pairs of side-by-side openings 93a,93b and 94a,94b of a fourth set of openings defined by the baseplate 87. Referring also to FIG. 12, the distal ends of each pair of stakes 90a,90b and are secured by being joined by a suitable thermal forming process to form bridges 96 and 97. In general, the bridges 96 and 97 between the pairs of side-by-side stakes 90a,90b and 91a,91b provide greater strength to the attachment between the module cover 83 and the baseplate 87 than the bridge 80 between the pairs of end-to-end stakes 65a,65b of FIG. 9, but the side-by-side stake design increases the complexity of the module cover injection molding process.

It should be appreciated that the bridges shown in FIGS. 9 and 12 are idealized and the bridges actually formed may be somewhat different in shape, as long as the distal ends of the stakes are joined so that the stakes cannot be withdrawn from the openings. Preferably, the bridges butt against the second surface 74 of the baseplate Referring now to FIGS. 13 through 15, a passenger side airbag module 110 according to the present invention is also provided. The airbag module 110 comprises a module housing 112 including a trough-shaped reaction canister 114 having a first sidewall 116a and a second sidewall 116b defining opposing ends closed by a first endplate 118a and a second endplate 118b, the reaction canister and endplates defining a mouth 120 of the module housing. A first flange 122 extends generally perpendicularly outwardly from the first sidewall 116a of the reaction canister 114, spaced-apart from the mouth 120 of the module housing 112, and defines a first set of three openings 123a–123c. A second flange 125 extends generally perpendicularly outwardly from the second sidewall 116b, spaced-apart from the mouth of the module housing, and defines a second set of three openings 126a–126c. A third flange 128 extends generally perpendicularly outwardly from the first endplate 118a, spaced-apart from the mouth of the module housing, and defines a third set of four openings 129a–129d. A fourth flange 131 extends generally perpendicularly outwardly from the second endplate 118b, spaced-apart from the mouth of the module housing, and defines a fourth set of four openings 132a–132d. The flanges 122,125,128,131 have first surfaces (not shown but facing the module cover 138) and second surfaces 170a–170d opposite the first surfaces.

A folded, inflatable airbag cushion 134 and an airbag inflator (an end 136 of the inflator is shown) are secured within the reaction canister 114 between the endplates 118a,118b. The inflator, the airbag cushion 134 and how the inflator and airbag cushion are secured in the reaction canister 114 are known in the art and, therefore, not described here in detail.

Figure 13:
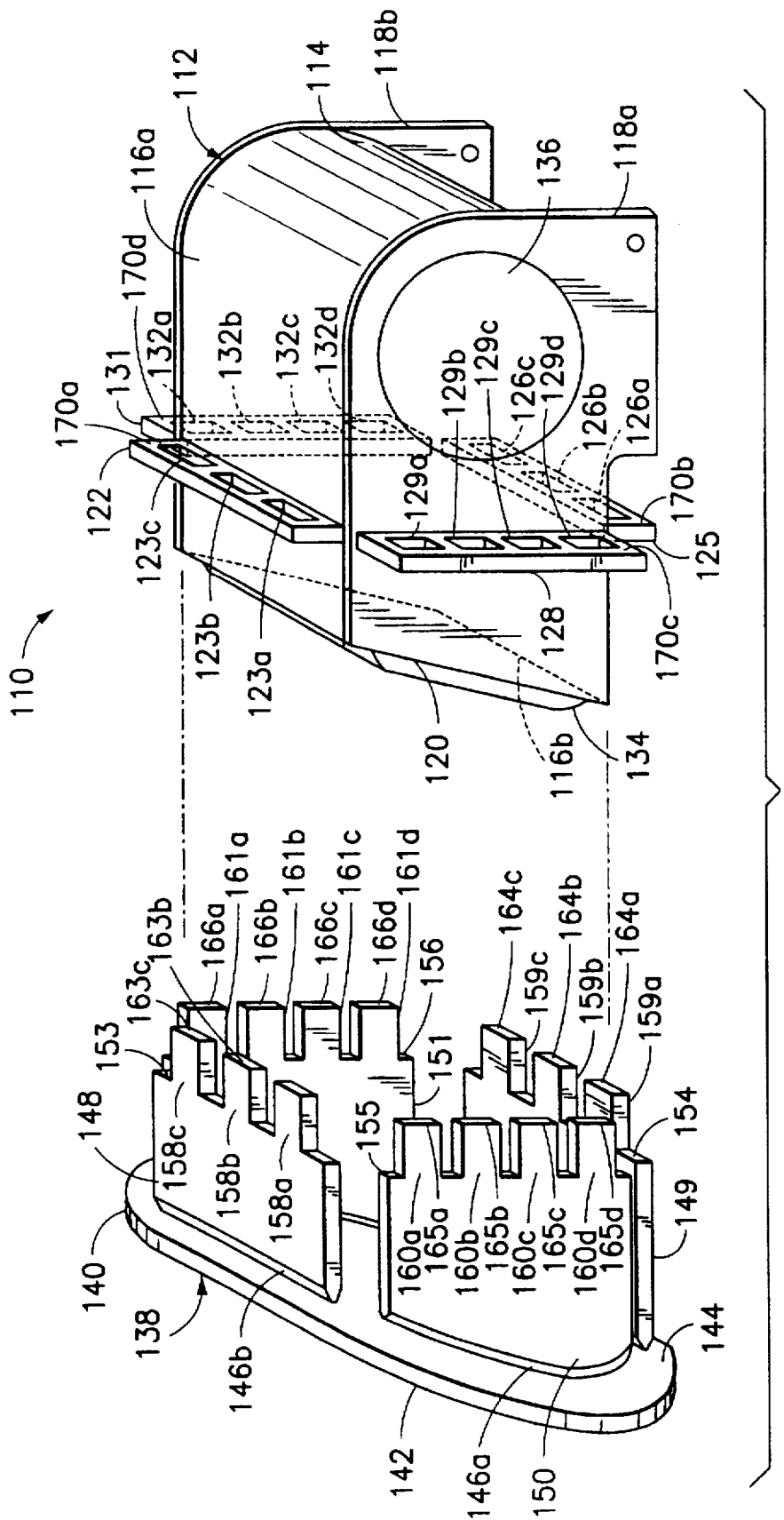
FIG. 13 is a perspective side view of a passenger side airbag module according to the present invention with a module cover detached from a reaction canister of the airbag module.

The airbag module 110 also includes a thermoplastic module cover 138 including a lid 140. The lid 140 has a decorative outer surface 142 and an inner surface 144, and is positioned over the folded airbag cushion 134 and the mouth 120 of the module housing 112. As best seen in FIG. 13, a first attachment leg 148 and a second attachment leg 149 are unitary with and extend from the inner surface 144 of the lid 140 and terminate at bottom edges 153,154. The first and the second attachment legs 148,149 are in spaced, opposing relationship in alignment with the first and the second sets of openings 123a–123c,126a–126c defined by the module housing 112. A third attachment leg 150 and a fourth attachment leg 151 are unitary with and extend from the lid 140 and terminate at bottom edges 155,156. The third and the fourth attachment legs 150,151 are in spaced, opposing relationship in alignment with the third and the fourth sets of openings 129a–129d, 132a–132d defined by the module housing 112.

The bottom edges 153–156 of the four attachment legs 148–151 butt, respectively, against the first surfaces of the four flanges 122,125,128,131 extending from the module housing 112, and in alignment with the four sets of openings 123a–123c,126a–126c, 129a–129d,132a–132d defined by the four flanges. Together, the four attachment legs 148–151 space the lid 140 away from the mouth 120 of the module housing 112 and generally form a rectangle surrounding the folded airbag cushion 134 and the mouth. The four attachment legs 148–151, the lid 140 and the module housing 112 substantially contain and protect the folded airbag cushion 134. It should be noted, however, that the four, separate attachment legs 148–151 could be unitary in the form of a single, continuous attachment wall defining a rectangle or another suitable shape such as a circle, for example. In addition, the module cover 138 could have more or less than four attachment legs with the module housing 112 defining a similar number of sets of openings, as long as the module cover has at least two spaced, opposed attachment legs.

Three spaced-apart stakes 158a–158c are unitary with and extend from the bottom edge 153 of the first attachment leg 148 to distal ends 163a–163c, and three spaced-apart stakes 159a–159c are unitary with and extend from the bottom edge 154 of the second attachment leg 149 to distal ends 164a–164c. Four spaced-apart stakes 160a–160d are unitary with and extend from the bottom edge 155 of the third attachment leg 150 to distal ends 165a–165d, and four spaced-apart stakes 161a–161d are unitary with and extend from the bottom edge 156 of the fourth attachment leg 151 to distal ends 166a–166d. The number of stakes extending from the attachment legs and the number of openings in the sets of openings can be suitably increased or decreased.

Figure 14:
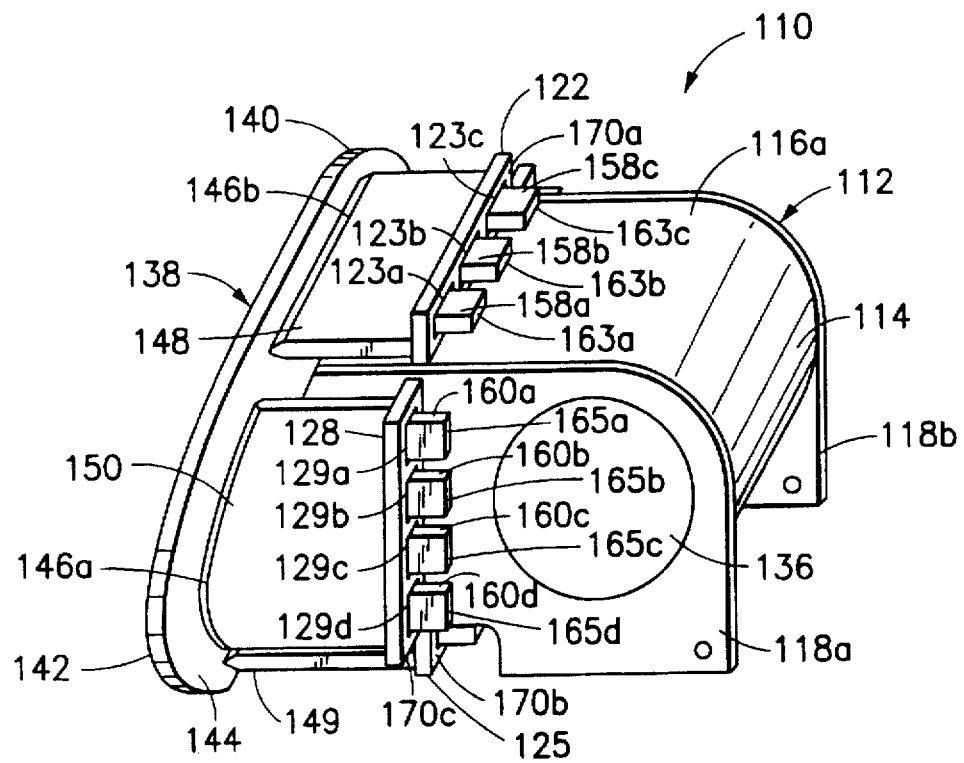
FIG. 14 is a perspective view of the airbag module of FIG. 13 with a plurality of stakes of the module cover extending through a plurality of openings defined by the reaction canister.

As shown in FIG. 14, each of the stakes 158a–158c of the first attachment leg 148 extends through one of the openings of the first set of openings 123a–123c, and each of the stakes 159a–159c of the second attachment leg 149 extends through one of the openings of the second set of openings 126a–126c. Also, each of the stakes 160a–160d of the third attachment leg 150 extends through one of the openings of the third set of openings 129a–129d, and each of the stakes 161a–161d of the fourth attachment leg 151 extends through one of the openings of the fourth set of openings 132a–132d.

Figure 15:
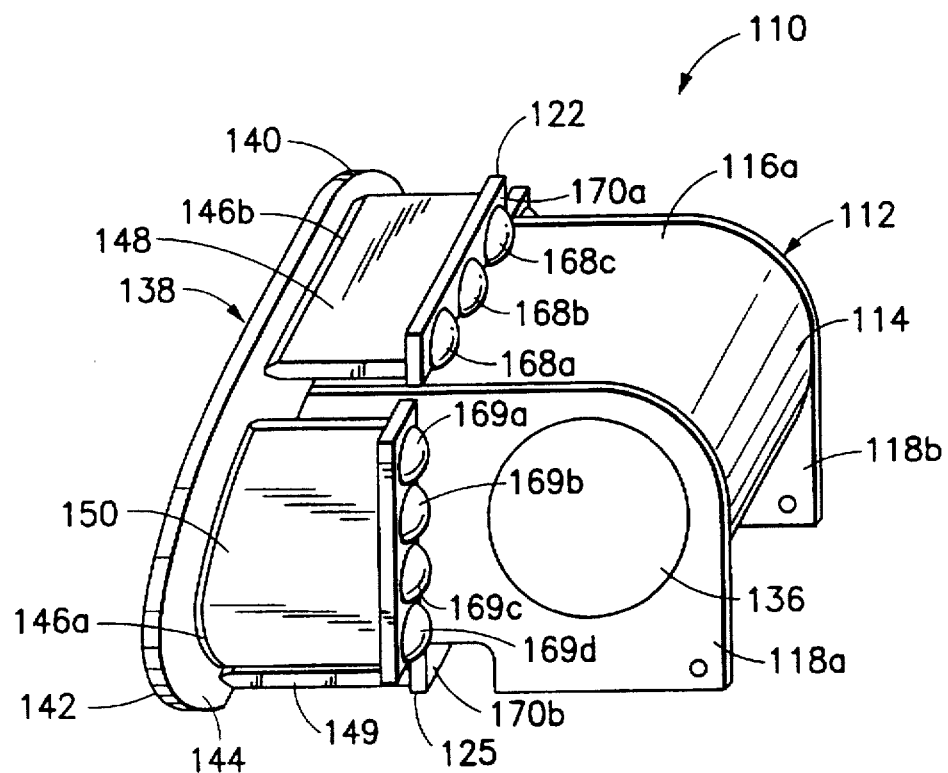
FIG. 15 is a perspective view of the airbag module of FIGS. 13 and 14 with distal ends of the plurality of stakes of the module cover formed into heads, securing the module cover to the reaction canister.

The distal ends 163a–163c,164a–164c,165a–165d, 166a–166d of all the stakes 158a–158c,159a–159c, 160a–160d,161a–161d are secured against the second surfaces 170a–170b of the flanges 122, 125,128,131 such that the stakes cannot be withdrawn from the openings 123a–123c,126a–126c,129a –129d,132a–132d defined by the flanges, securing the module cover 138 to the module housing 112. Specifically, as shown in FIG. 15, the distal ends of the stakes 158a–158c of the first attachment leg 148 form heads 168a–168c and the distal ends of the stakes 159a–159c of the third attachment leg 150 form heads 169a–169d (the heads of the second and the fourth attachment legs are not shown but are similar). The distal ends are formed into heads by a suitable thermal forming process such as ultrasonic welding, for example. Preferably, the heads butt against the second surfaces 170a–170b of the flanges 122,125, 128,131. Alternatively, the distal ends could be fused to channel sections, or the stakes and openings could be provided in pairs, with the distal ends of pairs of stakes being formed into bridges as discussed above with respect to the airbag modules of FIGS. 1–12. The module cover 138 also includes three tear seams 146a,146b defined by the first, the third and the fourth attachment legs 148,150,151 (the third tear seam is not shown but is similar to tear seam 146a). The tear seams 146a,146b run parallel with the lid 140 and preferably are positioned where the attachment legs join the lid. Alternatively, the lid can define at least one tear seam.

The present invention, therefore, provides a novel, simple and effective module cover attachment and a method of attaching a module cover to an airbag module. Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An airbag module comprising:

A) a module housing defining a first set of openings and a second set of openings, the first set of openings in spaced, opposed relation to the second set of openings;

B) a folded, inflatable airbag cushion secured to the module housing between the first and the second sets of openings;

C) an airbag inflator secured to the module housing for providing inflation gas for inflating the airbag cushion; and D) a module cover defining at least one tear seam, the module cover comprising:

a lid positioned over the airbag cushion, the lid having an inner surface and an outer surface;

a first attachment leg and a second attachment leg unitary with and extending from the inner surface of the lid and terminating at bottom edges butting against a first surface of the module housing, the first attachment leg and the second attachment leg in spaced, opposing relationship in alignment, respectively, with the first and the second sets of openings defined by the module housing, with the airbag cushion located between the attachment legs;

a plurality of spaced-apart stakes extending from the bottom edges of each of the first and the second attachment legs, each of the stakes extending through one of the openings of the first and second sets of openings and terminating in a distal end; and joining means securing the distal ends of adjacent stakes against a second surface of the module housing opposite the first surface so that the stakes cannot be withdrawn from the openings.

2. The airbag module of claim 1 wherein each plurality of stakes are provided in pairs of adjacent stakes, with the joining means securing the distal ends of the stakes comprising the distal ends of each pair of adjacent stakes being joined and forming a bridge between the pair of adjacent stakes.

3. The airbag module of claim 1 wherein the joining means securing the distal ends of adjacent stakes comprises:

a first channel section having a groove positioned over the distal ends of the plurality of stakes extending from the first attachment leg, with the distal ends of said plurality of stakes attached to the first channel section; and a second channel section having a groove positioned over the distal ends of the plurality of stakes extending from the second attachment leg, with the distal ends of said plurality of stakes attached to the second channel section.

4. The airbag module of claim 3 wherein the distal ends of each plurality of stakes are fused to the channel sections.

5. The airbag module of claim 1 wherein the module housing comprises a generally rectangular and flat baseplate defining a generally circular aperture receiving the airbag inflator.

6. The airbag module of claim 5 further comprising:

a third set of openings and a fourth set of openings defined by the baseplate, the third set of openings in spaced, opposed relation to the fourth set of openings with the airbag cushion located therebetween, the four sets of openings generally forming a rectangle;

a third attachment leg and a fourth attachment leg unitary with and extending from the inner surface of the lid and terminating at bottom edges butting against the first surface of the baseplate, the third attachment leg and the fourth attachment leg in spaced, opposing relationship in alignment, respectively, with the third and the fourth sets of openings defined by the baseplate;

a plurality of spaced-apart stakes extending from the bottom edges of each of the third and the fourth attachment legs, each of said stakes extending through one of the openings of the third and the fourth sets of openings and terminating in a distal end; and joining means securing the distal ends of adjacent stakes of the third and fourth attachment legs against the second surface of the baseplate opposite the first surface so that each plurality of stakes extending from the third and the fourth attachment legs cannot be withdrawn from the openings of the third and the fourth sets of openings.

7. The airbag module of claim 6 wherein the four pluralities of stakes are provided in pairs of adjacent stakes, with the joining means securing the distal ends of the stakes comprising the distal ends of each pair of adjacent stakes being joined and forming a bridge between the pair of adjacent stakes.

8. The airbag module of claim 6 wherein the joining means securing the distal ends of the four pluralities of stakes comprises:

a first channel section having a groove positioned over the distal ends of the plurality of stakes extending from the first attachment leg, with the distal ends of said plurality of stakes attached to the first channel section;

a second channel section having a groove positioned over the distal ends of the plurality of stakes extending from the second attachment leg, with the distal ends of said plurality of stakes attached to the second channel section;

a third channel section having a groove positioned over the distal ends of the plurality of stakes extending from the third attachment leg, with the distal ends of said plurality of stakes attached to the third channel section; and a fourth channel section having a groove positioned over the distal ends of the plurality of stakes extending from the fourth attachment leg, with the distal ends of said plurality of stakes attached to the fourth channel section.

9. The airbag module of claim 8 wherein the distal ends of the four pluralities of stakes are fused to the four channel sections.

10. The airbag module of claim 1 wherein the module housing comprises a trough-shaped reaction canister having a first and a second sidewall defining opposing ends closed by a first and a second endplate, the reaction canister and endplates defining a mouth of the module housing.

11. The airbag module of claim 10 further comprising:

a first flange extending outwardly from the first sidewall of the reaction canister and defining the first set of openings;

a second flange extending outwardly from the second sidewall of the reaction canister and defining the second set of openings;

a third flange extending outwardly from the first endplate of the reaction canister and defining a third set of openings;

a fourth flange extending outwardly from the second endplate of the reaction canister and defining a fourth set of openings;

a third attachment leg and a fourth attachment leg extending from the lid and terminating at bottom edges butting, respectively, against first surfaces of the third and the fourth flanges in alignment with the third and the fourth sets of openings;

a plurality of spaced-apart stakes extending from the bottom edges of each of the third and the fourth attachment legs, each of said stakes extending, respectively, through one of the openings of the third and the fourth sets of openings and terminating in a distal end; and joining means securing the distal ends of adjacent stakes extending from the third and the fourth attachment legs against second surfaces of the third and the fourth flanges opposite the first surfaces so that said pluralities of stakes cannot be withdrawn from the openings of the third and the fourth sets of openings.

12. The airbag module of claim 11 wherein the at least one tear seam of the module cover comprises three tear seams defined by three of the four attachment legs, the three tear seams running parallel with the lid.

13. The airbag module of claim 11 wherein the four pluralities of stakes are provided in pairs of adjacent stakes, with the joining means securing the distal ends of the stakes comprising the distal ends of each pair of adjacent stakes being joined and forming a bridge between the pair of adjacent stakes.

14. The airbag module of claim 11 wherein the joining means securing the distal ends of the four pluralities of stakes comprises:

a first channel section having a groove positioned over the distal ends of the plurality of stakes extending from the first attachment leg, with the distal ends of said plurality of stakes attached to the first channel section;

a second channel section having a groove positioned over the distal ends of the plurality of stakes extending from the second attachment leg, with the distal ends of said plurality of stakes attached to the second channel section;

a third channel section having a groove positioned over the distal ends of the plurality of stakes extending from the third attachment leg, with the distal ends of said plurality of stakes attached to the third channel section; and a fourth channel section having a groove positioned over the distal ends of the plurality of stakes extending from the fourth attachment leg, with the distal ends of said plurality of stakes attached to the fourth channel section.

15. The airbag module of claim 14 wherein the distal ends of the four pluralities of stakes are fused to the channel sections.

16. A method of attaching a module cover to an airbag module, the method comprising:

A) providing an airbag module comprising:

a module housing defining a first set of openings and a second set of openings, the first set of openings in spaced, opposed relation to the second set of openings;

an inflatable airbag cushion secured to the module housing between the first set and the second set of openings; and an airbag inflator secured to the module housing for providing inflation gas for inflating the airbag cushion;

B) providing a module cover defining at least one tear seam, the module cover comprising:

a lid having an inner surface and an outer surface;

a first attachment leg and a second attachment leg extending from the inner surface of the lid and terminating at bottom edges, the first attachment leg and the second attachment leg in spaced, opposing relationship in alignment, respectively, with the first and the second sets of openings defined by the module housing; and a plurality of spaced-apart stakes extending from the bottom edges of each of the first and the second attachment legs to distal ends;

C) inserting the plurality of stakes extending from the first attachment leg through the openings of the first set of openings, and the plurality of stakes extending from the second attachment leg through the openings of the second set of openings until the bottom edges of the first and the second attachment legs butt against a first surface of the module housing; and D) joining the distal ends of adjacent stakes of each plurality of stakes against a second surface of the module housing opposite the first surface such that the stakes cannot be withdrawn from the openings of the first and the second set of openings.

17. The method of attaching a module cover to an airbag module as defined in claim 16 wherein each plurality of stakes are provided in pairs of adjacent stakes and the distal ends of each pair of adjacent stakes are joined by being joined in a bridge between the pair of adjacent stakes.

18. The method of attaching a module cover to an airbag module as defined in claim 17 wherein the distal ends of each pair of adjacent stakes are joined into bridges by thermal forming.

19. The method of attaching a module cover to an airbag module as defined in claim 16 wherein the distal ends of the stakes are joined by:

providing a first channel section having a groove, and a second channel section having a groove;

positioning the groove of the first channel section over the distal ends of the plurality of stakes extending from the first attachment leg, and attaching said distal ends to the first channel section; and positioning the groove of the second channel section over the distal ends of the plurality of stakes extending from the second attachment leg, and attaching said distal ends to the second channel section.

20. The method of attaching a module cover to an airbag module as defined in claim 19 wherein the distal ends are fused to the first and the second channel sections.

* * * * *